United States Patent

Berlureau et al.

[11] Patent Number: 5,986,432
[45] Date of Patent: Nov. 16, 1999

[54] METHOD OF CHARGING MAINTENANCE-FREE NICKEL METAL HYDRIDE STORAGE CELLS

[75] Inventors: Thierry Berlureau; Jean-Louis Liska, both of Bordeaux, France

[73] Assignee: Alcatel, Paris, France

[21] Appl. No.: 09/033,711

[22] Filed: Mar. 3, 1998

[30] Foreign Application Priority Data

Mar. 3, 1997 [FR] France ................................ 97 02508

[51] Int. Cl.⁶ .................................................... H01M 10/44

[52] U.S. Cl. ............................................................. 320/125

[58] Field of Search ...................................... 320/125, 137, 320/139, 144, 150, FOR 134

[56] References Cited

FOREIGN PATENT DOCUMENTS

| 0 308 543 A2 | 3/1989 | European Pat. Off. . |
| 0 626 746 A1 | 11/1994 | European Pat. Off. . |
| 0 689 275 A1 | 12/1995 | European Pat. Off. . |

*Primary Examiner*—Edward H. Tso
*Attorney, Agent, or Firm*—Sughrue, Mion, Zinn, Macpeak & Seas, PLLC

[57] ABSTRACT

A method of charging an industrial maintenance-free Ni-MH storage cell, the method comprising in combination a first stage at a constant current $I_1$ lying in the range $I_c/10$ to $I_c/2$, and a second stage at a constant current $I_2$ lying in the range $I_c/50$ to $I_c/10$, the changeover from the first stage to the second stage taking place when the time derivative of the temperature reaches a threshold value which varies as a function of the temperature at the time of the changeover.

10 Claims, 4 Drawing Sheets

METHOD OF CHARGING MAINTENANCE-FREE NICKEL METAL HYDRIDE STORAGE CELLS

The invention relates to a method of charging nickel metal hydride (Ni-MH) storage cells that do not require maintenance. Such cells are usually mounted in high capacity batteries (10 Ah to 200 Ah) which are designed in particular for fitting to land vehicles or to aircraft.

BACKGROUND OF THE INVENTION

Alkaline electrolyte storage cells presently on the market are either of the "open" type (also referred to as being of the "industrial" type) enabling gas to be interchanged with the surrounding atmosphere, or else of the "sealed" type (also referred to as the "portable" type) having no interchange with the outside in normal operation. Most "sealed" type storage cells are intended mainly for incorporation in portable appliances; they are therefore small in size and of limited capacity. "Open" type storage cells are usually prismatic in shape, of high capacity, and low internal pressure. Storage cells of this type need to have their electrolyte level periodically readjusted because of losses by electrolysis and by evaporation, due to the contact with the ambient atmosphere. The increasingly tight requirements of users of "open" type storage cells have led to the development of storage cells that do not require maintenance, with this being done by reducing their interchanges with the outside.

The Ni-MH couple under development provides high performance, but it has been observed that it is necessary to put a strict limit on overcharging phenomena in such storage cells in order to guarantee satisfactory lifetime. For example, in the context of use for electric vehicle traction, the lifetime must be at least 1500 charge/discharge cycles. The performance of Ni-MH batteries depends on the charging method used enabling a maximum charge state to be achieved without accepting a large overcharge coefficient.

A maintenance-free alkaline electrolyte cell is charged in two stages. A first stage comprises charging proper, and corresponds to oxido-reduction of the active materials of the electrodes. For an Ni-MH storage cell, this reaction is slightly exothermal and it takes place without gas being given off. Once all of the active material of the positive electrode has been transformed, the cell enters a second stage known as the "overcharging" stage, during which oxygen is given off by the positive electrode. Electrochemical reduction of the oxygen at the negative electrode, or "recombination", leads firstly to an increase in temperature (exothermal reaction) which has the side effect of lowering the voltage of the cell, and secondly to increasing the internal pressure of the cell due mainly to the oxygen that is being recombined.

The higher the temperature at which the cell is being charged, the more progressive the changeover from the charging stage to the overcharging stage, thus making it that much more difficult to detect. Consequently, it is necessary to monitor permanently the parameters of a battery that is being charged.

Firstly, the charging method must make it possible to reach the maximum chargeable capacity with the best possible efficiency. Unfortunately, the chargeability of an Ni-MH cell decreases as its internal temperature increases. It is therefore necessary to define a method making it possible to optimize charging regardless of the initial charge state of the battery and regardless of the way its internal temperature varies during charging. The method may be included in the battery management system to enable the user to charge the battery without risk either for the environment or for the battery.

The charging method must also avoid allowing the internal pressure of the cell to increase excessively. In the event of excess pressure, safety valves open and as a result a loss of capacity is observed over cycling due to progressive drying out of the cell.

Finally, the charging method must minimize the duration of the overcharging stage. Overcharging is necessary to finish off the charging performed during the first stage, firstly to maximize the charge of the cell and secondly, in a battery of cells, to bring the various cells to a uniform charge level. The problem lies in selecting a reliable criterion for indicating the end of charging regardless of the initial conditions in which a battery was to be found. This criterion can only be based on the available physical parameters: voltage, pressure, and/or temperature.

The following end-of-charging criteria have already been proposed:

voltage drop ($-\Delta V$), which criterion is commonly used for the Ni—Cd couple with a switchover signal being generated conventionally at about $-10$ mV to $-20$ mV, this criterion is not suitable for application to the Ni-MH couple because of the small voltage signal generated by this couple at the end of charging (0 to $-5$ mV);

the absolute increase in temperature ($+\Delta\theta$) of the cell between the beginning and the end of charging; this criterion is difficult to apply to the Ni-MH couple because temperature begins to increase as soon as charging begins;

the relative increase in cell temperature compared with a reference heating relationship ($\theta - \theta_{ref}$), which method was adapted to the Ni-MH couple after the exothermal behavior of the charging stage of said couple had been modelled mathematically (FR-2 705 835); the switchover signal used is generally of the order of $+10°$ C. to $+15°$ C. for the Ni—Cd couple, but only of the order of $+5°$ C. to $+6°$ C. for the Ni-MH couple; and the rate of change of cell temperature, i.e. the time derivative of the temperature ($+d\theta/dt$), which criterion is frequently used for the Ni-MH couple because of the small size of the absolute temperature signal as generated by said couple at the end of charging; the switchover signal used is conventionally of the order of $20°$ C./hour to $60°$ C./hour.

All of those criteria relate to charging method adapted to cells of the sealed type and of small size, having a metal container that is generally cylindrical, and of small capacity (approximately up to 10 Ah). Those cells use a recharging method based on a high rate sequence ($I_c/2$ to $2I_c$, i.e. charging at a rate that enables 100% of the capacity to be charged in 2 h to ½h). Since portable cells have low thermal inertia, they are very sensitive to variations in outside temperature. Their charging method can be interfered with by changes in the temperature of the environment in which they are placed (charging turned off too soon, charging not turned off at all, etc. . . . ). Documents DE-4 332 533, WO-92/11680, and WO-89/02182 have proposed taking account of any such possible fluctuations by using criteria based on cell temperature ($+\Delta\theta$ and $+d\theta/dt$) together with a correction for ambient temperature.

Maintenance-free industrial Ni-MH cells have much larger capacities (10 Ah to 200 Ah) than do portable cells. Their rectangular shapes and the nature of their containers (plastics material) do not enable them to withstand significant excess pressure. Consequently, high rate charging governed by the above-mentioned criteria is not possible without running the risk firstly of the safety valves opening and secondly of significant heating, and that is prejudicial to the lifetime of the cell.

OBJECTS AND SUMMARY OF THE INVENTION

An object of the invention is to propose a method of charging at a moderate rate which is specifically adapted to industrial maintenance-free Ni-MH cells and which avoids the above-mentioned drawbacks.

The present invention provides a method of charging an industrial maintenance-free Ni-MH storage cell, the method comprising in combination:

a "charging" first stage performed at a constant current $I_1$ lying in the range $I_c/10$ to $I_c/2$ where $I_c$ is the current that would discharge said cell in one hour, during which stage the temperature θ of said cell increases; and a second "overcharging" stage performed at a constant current $I_2$ lying in the range $I_c/50$ to $I_c/10$; changeover from said first stage to said second stage taking place when the time derivative of said temperature dθ/dt reaches a threshold value (dθ/dt), which varies as a function of the temperature θ of said cell at the moment of said changeover: $(dθ/dt)_s=f(θ)$.

In a variant of the invention, said threshold value $(dθ/dt)_s$ also depends on said current $I_1$ of said first stage, to a lesser extent.

This method has the advantage of being usable over a wide temperature range. Nevertheless, it is necessary to restrict it to a temperature range that is acceptable for cell operation since charging performed at too high or too low a temperature would run the risk of damaging the cell irreversibly. The range is preferably chosen to be −20° C. to +50° C. Within this temperature range, the threshold value $(dθ/dt)_s$ generally lies in the range 4° C./hour to 10° C./hour.

In an implementation, said threshold value lies between a lower limit defined by the impact of external temperature disturbances on the cell, and an upper limit defined by the maximum value that said time derivative of the temperature dθ/dt can reach minus said impact.

This upper limit takes into account heat exchanges between the cell and its external environment. In particular, the battery of an electric vehicle can be subjected to temperature disturbance due to a sudden change in the temperature of the environment, for example if the user drives the car out of an air-conditioned garage onto hot hardtop. If charging begins at that moment, the temperature of the battery will increase more quickly. This impact is taken into account when selecting the charging method.

It should be observed that the effect on the signal dθ/dt of a change in ambient temperature of less than 20° C. is practically negligible because of the large thermal inertia of industrial cells due to their design (plastic container and limited electrolyte) which does not favor heat exchange.

In another implementation, said threshold value $(dθ/dt)_s$ covers at least one temperature range in which it remains substantially constant followed by a range in which it decreases with an increase in said temperature θ. It is the ability of the cell to charge under the conditions imposed thereon which determines the temperature range in which the threshold value is constant.

Preferably, said threshold value $(dθ/dt)_s$ decreases in substantially linear manner when the temperature of said cell rises. The coefficients of the linear equation are determined either experimentally, or by calculation on the basis of a model of the thermal behavior of the cell in its environment.

In accordance with the present invention, the capacity $C_2$ charged during said second stage depends on the capacity $C_1$ charged during said first stage. Advantageously, said capacity $C_2$ is a linear function of said capacity $C_1$.

For an industrial maintenance-free Ni-MH storage cell having a real capacity $C_r$, said capacity $C_1$ in Ah and said capacity $C_2$ in Ah are related by the linear relationship: $C_2=aC_1+b$ in which $a$ is a dimensionless coefficient lying in the range 0.01 to 0.2, and $b$ is a coefficient expressed in Ah lying in the range $-0.1C_r$ to $+0.1C_r$. The coefficients $a$ and $b$ depend on said temperature θ of the cell and on the charging rate I, used during the first stage; they are determined experimentally, e.g. from a curve representing the first charge. The selected overcharge percentage, usually 5% to 20% of the capacity of the cell, depends on the chargeability of the cell.

BRIEF DESCRIPTION OF THE DRAWINGS

Other characteristics and advantages of the invention appear from the following description. Reference is made to the accompanying drawings, in which.

MORE DETAILED DESCRIPTION

The experiments described below for illustrating the invention were performed on a maintenance-free battery having a nominal capacity $C_n$=127 Ah at a voltage of 312 V. The battery was made up of 52 modules each having five cells connected in series. The modules were cooled by water flowing along their side faces. The battery was fitted with temperature probes placed in a metal vessel extended by a plate situated between two modules and thermally insulated from the outside. That kind of battery is specifically adapted for use in electric vehicle traction.

Initially, the "charging" first stage was studied to determine the criterion for changeover to the "overcharging" second stage. In accordance with the invention, the first stage comes to an end when a threshold value (dθ/dt), is reached, which value depends on the temperature θ of the cell: $(dθ/dt)_s=f(θ)$. This value was determined experimentally using three series of tests.

Figure 1:
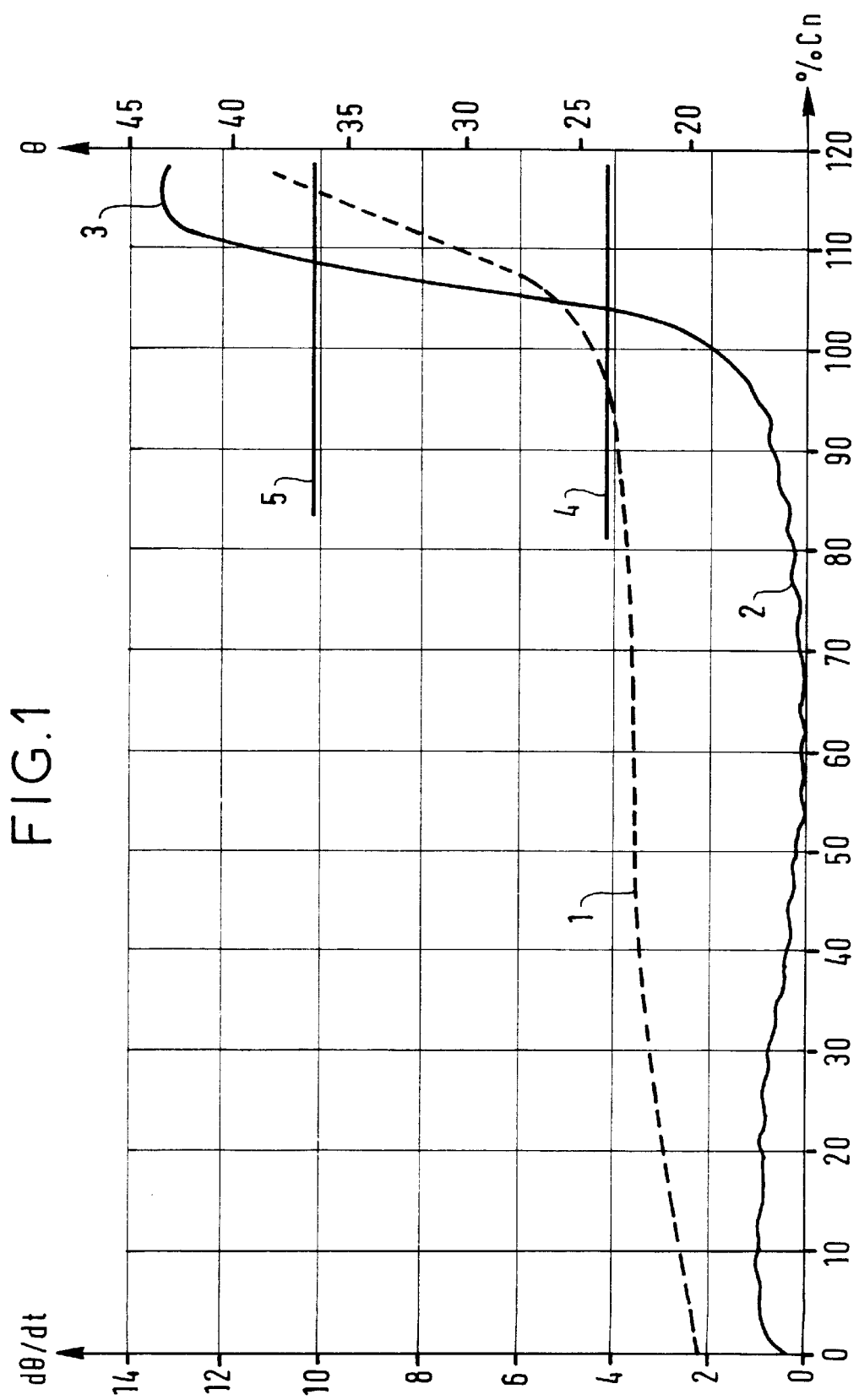
FIG. 1 is a graph showing variation in the temperature θ, in °C. and in its derivative dθ/dt, in ° C./h, for a first stage at a charging rate of $I_c/8$ plotted as a function of percentage charge $C_i$ expressed in percentage of the nominal capacity $C_n$ of the cell, with the temperature at the start of charging $θ_i$ being 22° C.

During charging, variation in the derivative dθ/dt was observed as a function of the charged capacity $C_1$ until a maximum slope value $(dθ/dt)_{max}$ was obtained. FIG. 1 shows how temperature θ (curve 1) and how its derivative dθ/dt (curve 2) varied when charging at a rate of 16 A ($I_c/8$) for a temperature at the beginning of charging equal to 22° C. Reference 3 gives the maximum value $(dθ/dt)_{max}$ reached by the derivative. This maximum value corresponds to the slope of temperature in the cell beginning to decrease when heat exchange with the outside begins to compensate for the energy delivered by the overcharging current. The criterion for stopping the charging first stage $(dθ/dt)_s$ is selected to lie in the range extending between the lower values 4 and the higher values 5 of the derivative dθ/dt.

The selected criterion must not be too low since temperature disturbances would then run the risk of interrupting charging in untimely manner. Simulations of real cases lead to imposing a minimum value of temperature variation of 4° C./hour for this battery, which corresponds, for example, to a vehicle that is suddenly subjected to a temperature change of about 20°C.

Nor must the selected criterion be too close to the maximum value of the derivative $(dθ/dt)_{max}$ since that would lead to a risk of the stop criterion never being reached so charging would never come to an end. The curve of variation in the time derivative of temperature dθ/dt can be changed, particularly under the effect of external temperature disturbances, and the shape of the curve is also observed to vary with cell aging. It is also desirable to limit the temperature within the cell.

The first series of tests consisted in successive operations of charging the battery at different rates, all starting from a completely discharged state. The first stage was performed respectively at currents of 16 A, i.e. $I_c/8$, 25 A, i.e. $I_c/5$, and 42 A, i.e. $I_c/3$. Similar experiments were performed at various temperatures lying within the desired operating range (−20° C.) for all three charging rates studied.

For a cell that has been completely discharged before charging ($C_i=0\%$), the results are summarized in Table I below where:

$θ_i$ and $(dθ/dt)_i$ represent respectively the temperature and its derivative at the beginning of charging;

$θ_{max}$ and $(dθ/dt)_{max}$ represent respectively the maximum values reached by the temperature and by its derivative during the first stage;

$θ_{f1}$ and $(dθ/dt)_s$ represent respectively the temperature at the end of the first stage and the threshold value of the derivative as defined above; and $Δθ=(Δ_{f1}−θ_i)$ represents the total change in temperature during charging increases: 8° C./hour at 27° C. and 47° C./h at 46° C. at the $I_c/8$ rate. The higher the temperature, the worse the chargeability, and thus the sooner the cell gives off oxygen. Since the oxygen reduction reaction is exothermal, it has an increasing effect on chargeability. Consequently, at high temperatures, the slope of the maximum temperature $(dθ/dt)_{max}$ is reached more quickly and the threshold value $(dθ/dt)_s$ is lower.

Figure 3:
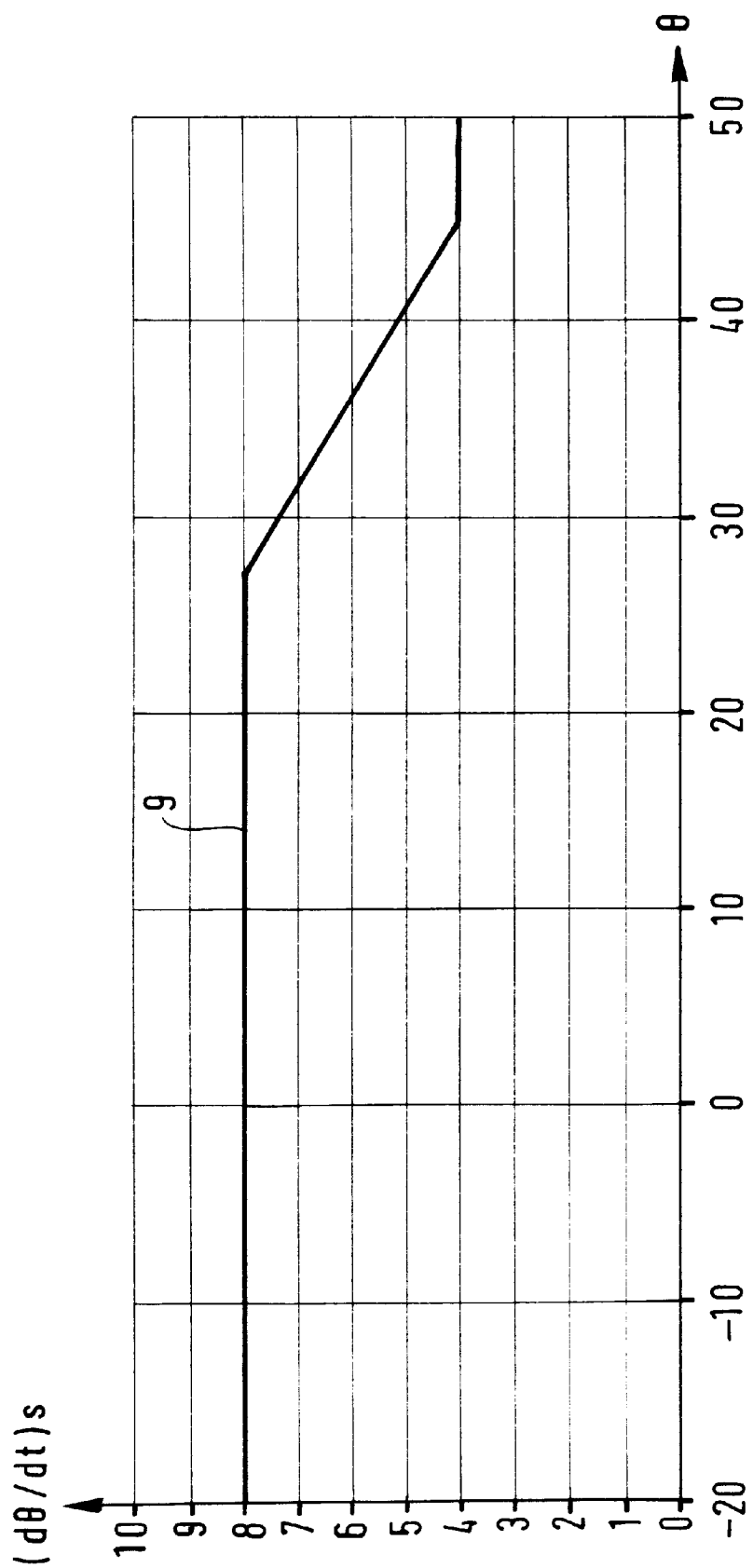
FIG. 3 is a graph showing how the threshold value $(dθ/dt)_s$ in °C./h varies as a function of the temperature θ of the cell in °C.

The relationship for variation in the threshold value $(dθ/dt)_s$ as a function of temperature θ is given by curve 9 in FIG. 3. It is a relationship of the form:

$(dθ/dt)_s=8°C./h$ for −18° C. <θ<27° C., and $(dθ/dt)_s=8−[(θ−27)/4]$ for $θ≧27°$ C.

For the three rates tested, the difference between the threshold value $(dθ/dt)_s$ and the value of the derivative of the temperature at the beginning of charging $(dθ/dt)_i$ was investigated.

For fully-discharged cells, it was found that the slope dθ/dt of the temperature rise at the beginning of charging lay in the range 1° C./hour to 6.8° C./hour. That phenomenon can be explained by high internal resistance at an initially low charging rate $C_i$ generating a significant quantity of dissipated heat by the Joule effect. At rates of $I_c/8$ and of $I_c/5$, the increase in temperature θ at the beginning of charging had no influence on the determination of the threshold value $(dθ/dt)_s$ since the generated temperature change was very small compared with the defined threshold value. However, at the $I_c/3$ rate, the initial slope of temperature variation $(dθ/dt)_i$ can be as much as 7° C./h, which is very close to the value $(dθ/dt)_s$ previously selected as the criterion for stopping the first stage: i.e. 8° C./hour.

There is therefore a risk of charging being interrupted prematurely since the difference between these values is only of the order of 1.5° C./hour to 2° C./hour. Consequently, it is necessary to envisage additional checks to prevent charging being interrupted without reason. The selected solution is to begin charging necessarily at a moderate rate, not more than 25 A ($I_c/5$), up to a charge percentage lying in the range 5% to 20%, and only then to change over to a higher rate of 42 A ($I_c/3$).

Thereafter, the "overcharging" second stage was investigated at a rate of 6 A, i.e. $I_c/20$, in order to determine the duration thereof. The idea was to find experimentally coefficients a and b relating the capacities $C_2$ and $C_1$ as charged respectively during the second stage and during the first stage:

$$C_2=(a×C_1)+b.$$

TABLE I

| I | $I_c/8$ | $I_c/8$ | $I_c/8$ | $I_c/8$ | $I_c/8$ | $I_c/8$ | $I_c/5$ | $I_c/5$ | $I_c/3$ | $I_c/3$ |
|---|---|---|---|---|---|---|---|---|---|---|
| $θ_i$ | 38 | 28 | 19 | 1 | −8 | −17 | 26 | 2 | 27 | 0 |
| $(dθ/dt)_i$ | 1 | 1 | 1 | 1 | 2 | 2 | 2 | 3 | 5 | 7 |
| $θ_{max}$ | 62 | 41 | 38 | 26 | 18 | 12 | 47 | 30 | 50 | 32 |
| $(dθ/dt)_{max}$ | 9 | 12 | 13 | 14 | 12 | 11 | 25 | 24 | 43 | 44 |
| $(dθ/dt)_s$ | 4 | 6 | 8 | 8 | 8 | 8 | 7 | 8 | 6 | 8 |
| $θ_{f1}$ | 46 | 34 | 27 | 8 | 1 | −5 | 33 | 9 | 39 | 12 |
| Δθ | 8 | 6 | 8 | 7 | 9 | 12 | 7 | 7 | 12 | 12 |

During charging, it can be seen that the increase in temperature Δθ is small and lies in the range 6° C. to 12° C., regardless of the initial charging temperature; this temperature difference increases with increasing charging rate.

At temperatures greater than ambient, and whatever the rate, it is observed that the threshold value decreases when the temperature $θ_{f1}$ (at the time charging is stopped)

The above-described battery was overcharged by 20% of its real capacity $C_r$ (140 Ah), giving an overcharged capacity $C_2$ of 28 Ah. The charging coefficient k was therefore 1.2 and the total charging performed was:

$C_1+C_2=1.2×C_r.$

In practice, it was observed that the end of the first stage is detected about 5 Ah late compared with the real capacity $C_r$ used as a reference. Thus during the first stage the total charge was $C_1$=145 Ah. This delay is represented by the coefficient $\underline{b}$ which is therefore equal to −5 in this case.

This gives:

$$a=1/C_1(C_2-b)=1/C_1[(1.2 \times C_r)-C_1-b]=0.19$$

The relationship for the battery was therefore:

$$C_2=0.19C_1-5.$$

In a second series of tests, the applicability to the battery of previously-defined criteria was verified. Those tests consisted in charging using the previously-determined threshold value to ensure that the restored capacity was optimal, that the charging coefficient over the first stage was not excessive, that the increase in pressure did not cause the safety valves to open, since that reduces capacity, and finally so that the criterion is applicable regardless of the initial state of charge of the battery ($C_i$ lying in the range 0% to 100%).

The first stage of charging was performed using a constant current of 16 A ($I_c/8$). The threshold value $(d\theta/dt)_s$ was set at 8° C./hour below a cell temperature of 27° C. Above that, the threshold value varied linearly with temperature as follows: $(d\theta/dt)_s=8-[(\theta-27)/4]$ up to 43° C. after which the threshold value was again constant at 4° C./hour when the temperature exceeded 43° C.

Figure 2:
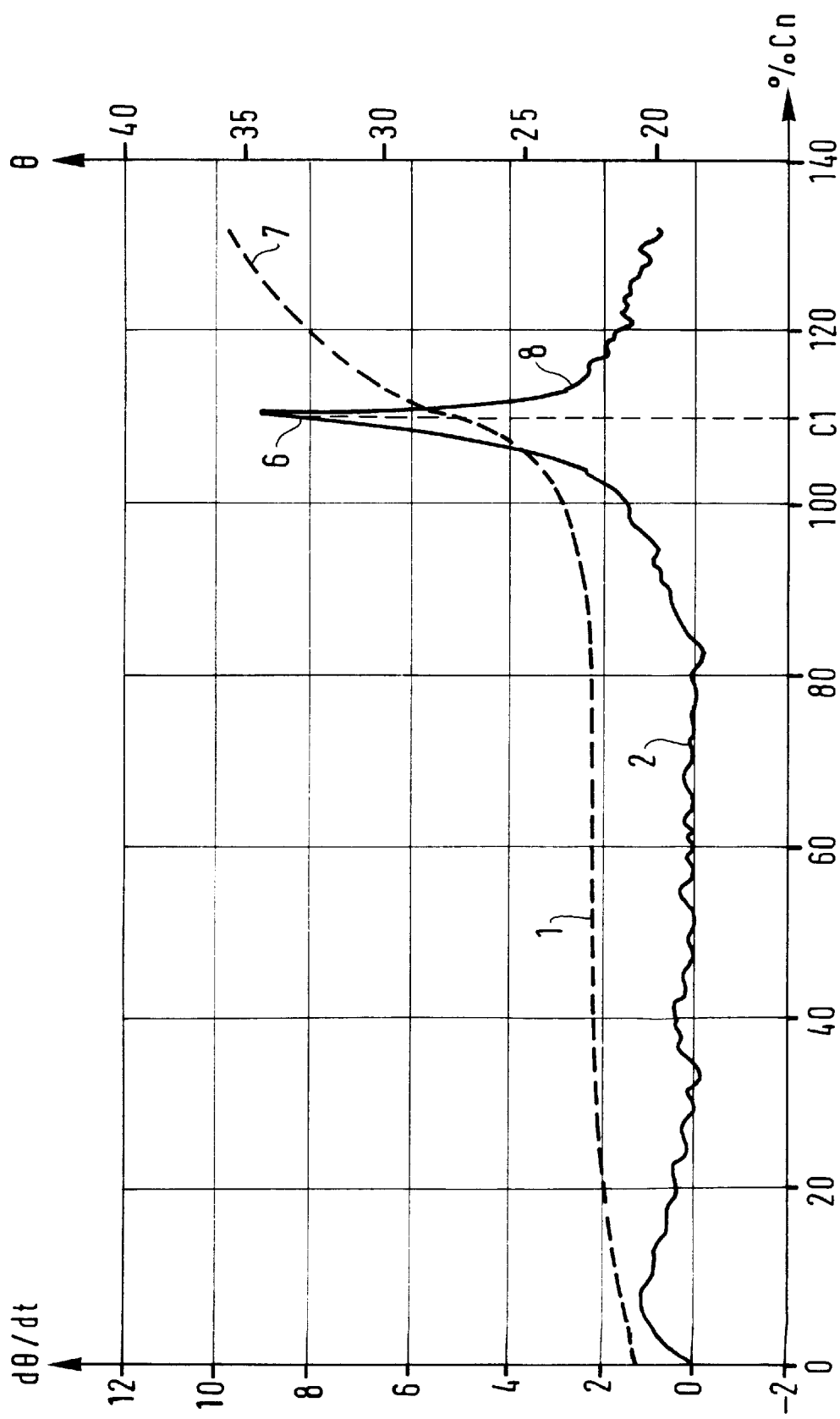
FIG. 2 is a graph analogous to that of FIG. 1, showing how the temperature θ in °C. and its derivative dθ/dt in °C./h vary for a first stage at the rate $I_c/8$ and a second stage at the rate $I_c/20$, as a function of percentage charge $C_i$ expressed in percentage of the nominal capacity $C_n$ of the cell, the temperature $θ_i$ at the beginning of charging being 20°C.

FIG. 2 shows how the temperature θ (curve 1) and its derivative dθ/dt (curve 2) varied at a charging rate of 16 A ($I_c/8$) when the temperature at the beginning of charging was 20° C. The criterion $(d\theta/dt)_s$ for stopping the first stage of charging 6 corresponded to the capacity $C_1$ charged during the first stage. The second stage is represented by the variation in temperature θ (curve 7) and its derivative dθ/dt (curve 8) at a rate of 6 A ($I_c/20$).

For cells that had been completely discharged prior to charging ($C_i$=0%), the results are summarized in Table II, which gives in particular:

the initial temperature $\theta_i$ of the battery and the temperatures $\theta_{f1}$ and $\theta_{f2}$ respectively at the ends of the two stages;

the initial slope of temperature variation $(d\theta/dt)_i$;

the capacities $C_1$ and $C_2$ charged respectively in each of the two stages;

the variations in pressure $\Delta P_1$ and $\Delta P_2$ for each of the two stages, respectively; and the charging coefficient $\underline{k}$ in percentage as defined by $k=[(C_1-C_2)/C_r] \times 100$.

The charging coefficient lies in the range 1.11 to 1.21 depending on the initial temperature $\theta_i$ of the cell and on the selected charging rate $I_1$. The capacities $C_r$ restored during discharging, whatever the charging rate, lie in the range 137 Ah to 149 Ah, i.e. the dispersion is less than 9 for a wide range of initial temperatures (−18° C. to +28° C.).

The pressure variation $\Delta P_1$ at the end of the first stage of charging is small (≦0.7 bars), which means that the end of first stage charging was detected soon enough. It can be seen that the pressure at the end of the first stage increases with temperature θ and with charging rate Finally, it was verified that applying the charging method of the invention did not give rise to damage to the battery in the event of the user deciding to recharge the battery without knowing whether the battery is charged or not. When the initial state of charge of the battery is 100%(recharging immediately after charging) it is undesirable for there to be a second stage after reaching the criterion marking the end of the first stage.

Figure 4:
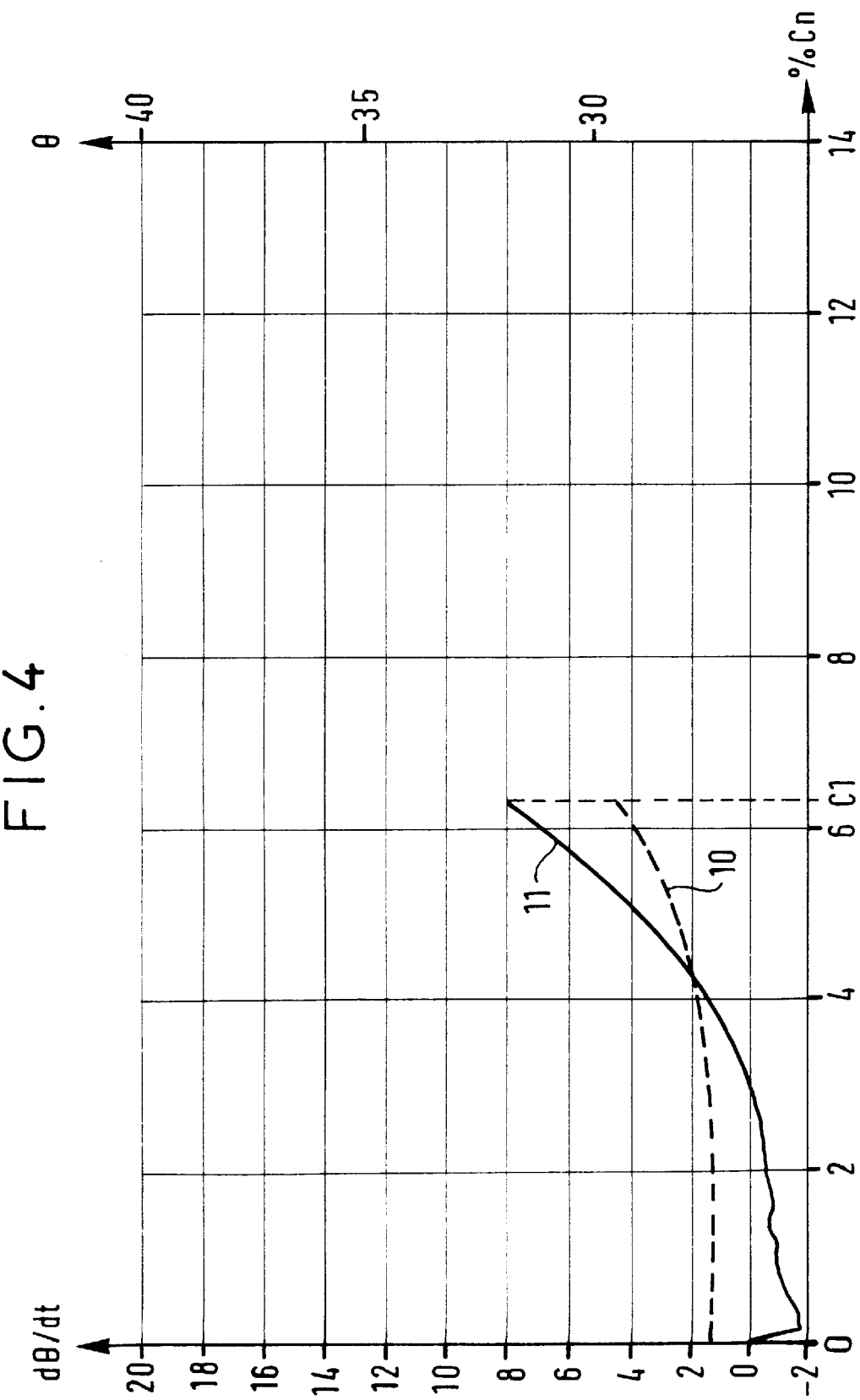
FIG. 4 is a graph analogous to that of FIG. 1, showing how the temperature θ and its derivatives dθ/dt vary when recharging an already charged cell at the $I_c/8$ rate.

Complete charging was previously obtained by applying the charging method of the invention; thereafter, charging was started over using a charging rate of $I_c/8$. This is illustrated by the curve in FIG. 4 which shows variation in temperature θ (curve 10) and in its derivative dθ/dt (curve 11) when recharging at a rate of $I_c/8$ starting from $C_i$=100% for a temperature at the beginning of charging equal to 25° C. The threshold value $(d\theta/dt)_s=8°$ C./h as previously defined for said temperature leads to the first stage being stopped after a capacity $C_1$ representing about 6.3% of the nominal capacity $C_n$, i.e. 8 Ah, has been charged.

For a cell that was fully charged before recharging ($C_i$=100%), the results of that experiment are summarized in Table III for various charging rates and for a wide initial temperature range of −13° C. to +37° C.

TABLE III

| I | $I_c/8$ | $I_c/8$ | $I_c/8$ | $I_c/5$ | $I_c/5$ | $I_c/3$ | $I_c/3$ |
|---|---|---|---|---|---|---|---|
| $\theta_i$ | 27 | −3 | −13 | 32 | 5 | 37 | 7 |
| $\theta_{f1}$ | 30 | −1 | −10 | 33 | 7 | 37 | 9 |
| $(d\theta/dt)_s$ | 8 | 7 | 6 | 6.5 | 8 | 6 | 8 |
| $C_1$ | 8 | 6 | 6 | 9 | 6 | 9 | 5 |
| $C_r$ | 137 | 147 | 143 | 146 | 150 | 142 | 147 |
| $\Delta P_1$ | 0.1 | 0.1 | 0.2 | 0.2 | 0.2 | 0.2 | 0.2 |

It can be seen that by interrupting charging on detecting the previously established threshold value $(d\theta/dt)_s$, about 5 Ah to 9 Ah is recharged ($C_1$) depending on the temperature θ and the charging rate $I_1$, thus corresponding to overcharging by a percentage lying in the range 4% to 7% of the nominal capacity $C_n$. These values are entirely acceptable

TABLE II

| I | $I_c/8$ | $I_c/8$ | $I_c/8$ | $I_c/8$ | $I_c/8$ | $I_c/8$ | $I_c/5$ | $I_c/5$ | $I_c/3$ | $I_c/3$ |
|---|---|---|---|---|---|---|---|---|---|---|
| $\theta_i$ | 27 | 21 | 19 | 3 | −5 | −18 | 26 | 2 | 28 | 2 |
| $\theta_{f1}$ | 36 | 30 | 25 | 10 | 0 | −5 | 33 | 10 | 40 | 14 |
| $\theta_{f2}$ | 49 | 40 | 34 | 20 | 11 | −1 | 40 | 17 | 48 | 17 |
| $(d\theta/dt)_i$ | 1 | 1 | 1 | 2 | 1 | 3 | 2 | 3 | 5 | 6 |
| $(d\theta/dt)_s$ | 6 | 8 | 8 | 8 | 7 | 6 | 6 | 8 | 6 | 8 |
| $C_1$ | 144 | 141 | 143 | 142 | 138 | 137 | 148 | 145 | 137 | 143 |
| $C_2$ | 22 | 28 | 22 | 22 | 21 | 21 | 23 | 22 | 21 | 22 |
| $\Delta P_1$ | 0.7 | 0.3 | 0.3 | 0.3 | 0.2 | 0.2 | 0.6 | 0.3 | 0.7 | 0.4 |
| $\Delta P_2$ | 1.1 | 0.6 | 0.5 | 0.6 | 0.5 | 0.2 | 0.8 | 0.5 | 1 | 0.4 |
| $C_r$ | 138 | 139 | 140 | 143 | 143 | 142 | 144 | 148 | 138 | 147 |
| k(%) | 1.21 | 1.22 | 1.18 | 1.15 | 1.12 | 1.11 | 1.18 | 1.13 | 1.14 | 1.13 | insofar as the pressures involved are much smaller than the pressure at which the safety valves open. At a given temperature, a comparison of the recharged capacities shows that these capacities are similar whatever the charging rate.

It is also desirable to define safety criteria that are independent of the normal charging parameters.

One of the experiments performed above (Table I) shows that the restored capacity is only 100 Ah when the battery at the end of the first stage is at a temperature $\theta_{f1}$ of 46° C., and that corresponds to only 80% of the nominal capacity $C_n$. The greater the temperature $\theta_{f1}$ at the end of charging, the smaller the restored capacity $C_r$. To ensure that the user has a battery that provides sufficient running time, it may be appropriate to avoid charging if the temperature exceeds an upper limit, e.g. 46° C. thereby ensuring that the running time of the battery is at least 80% and avoiding premature deterioration thereof.

Also, below a temperature constituting a lower limit, e.g. −18° C. there is a risk of the electrolyte solidifying which leads to very low ion mobility and thus to zero chargeability. To avoid that, it is preferable to prevent charging from taking place if the temperature is below this limiting value.

We claim:

1. A method of charging an industrial maintenance-free Ni-MH storage cell, the method comprising in combination:
    a first stage performed at a constant current $I_1$ lying in the range $I_c/10$ to $I_c/2$ where $I_c$ is the current that would discharge said cell in one hour, during which first stage the temperature $\theta$ of said cell increases; and
    a second stage performed at a constant current $I_2$ lying in the range $I_c/50$ to $I_c/10$;
changeover from said first stage to said second stage taking place when the time derivative of said temperature $d\theta/dt$ reaches a threshold value $(d\theta/dt)_s$ which varies as a function of said temperature $\theta$ at the moment of said changeover.

2. A method according to claim 1, in which said threshold value $(d\theta/dt)_s$ also depends on said current $I_1$ of said first stage.

3. A method according to claim 1, in which said threshold value $(d\theta/dt)_s$ lies between a lower limit defined by the impact on said cell of temperature disturbances external thereto and an upper limit defined by the maximum value that said time derivative of said temperature can reach, minus said impact.

4. A method according to claim 1, in which said threshold value $(d\theta/dt)_s$ covers at least one temperature range in which it remains substantially constant followed by a range in which it decreases with an increase in said temperature $\theta$.

5. A method according to claim 1, in which said threshold value $(d\theta/dt)_s$ decreases in substantially linear manner.

6. A method according to claim 1, in which the capacity $C_2$ charged during said second stage depends on the capacity $C_1$ charged during said first stage.

7. A method according to claim 1, in which said capacity $C_2$ is a linear function of said capacity $C_1$.

8. A method according to claim 7, in which for a cell having a real capacity $C_r$, said capacity $C_1$ in Ah and said capacity $C_2$ in Ah are related by the linear relationship: $C_2 = aC_1 + b$ in which $\underline{a}$ is a dimensionless coefficient lying in the range 0 to 0.2, and $\underline{b}$ is a coefficient expressed in Ah lying in the range $-0.1\ C_r$ to $+0.1\ C_r$.

9. A method according to claim 8, in which said coefficients $\underline{a}$ and $\underline{b}$ depend on said temperature $\theta$ of said cell.

10. A method according to claim 8, in which said coefficients $\underline{a}$ and $\underline{b}$ depend on said current $I_1$ of said first stage.

* * * * *